US011055135B2

(12) United States Patent
Popovic et al.

(10) Patent No.: US 11,055,135 B2
(45) Date of Patent: Jul. 6, 2021

(54) SYSTEMS AND METHODS FOR SCHEDULING JOBS FROM COMPUTATIONAL WORKFLOWS

(71) Applicants: Milos Popovic, Belgrade (RS); Goran Rakocevic, Belgrade (RS); Mihailo Andrejevic, Belgrade (RS); Aleksandar Minic, Belgrade (RS)

(72) Inventors: Milos Popovic, Belgrade (RS); Goran Rakocevic, Belgrade (RS); Mihailo Andrejevic, Belgrade (RS); Aleksandar Minic, Belgrade (RS)

(73) Assignee: SEVEN BRIDGES GENOMICS, INC., Charlestown, MA (US)

( * ) Notice: Subject to any disclaimer, the term of this patent is extended or adjusted under 35 U.S.C. 154(b) by 0 days.

(21) Appl. No.: 15/991,157

(22) Filed: May 29, 2018

(65) Prior Publication Data

US 2018/0349183 A1 Dec. 6, 2018

Related U.S. Application Data

(60) Provisional application No. 62/514,143, filed on Jun. 2, 2017.

(51) Int. Cl.
*G06F 9/48* (2006.01)
*G06F 9/50* (2006.01)
(Continued)

(52) U.S. Cl.
CPC ........ *G06F 9/4881* (2013.01); *G06F 9/45558* (2013.01); *G06F 9/5038* (2013.01);
(Continued)

(58) Field of Classification Search
CPC .................. G06F 9/4881; G06F 1/329; G06F 2009/4557; G06F 9/5038; G06F 9/45558; G06F 2209/5021; H04L 41/0806
See application file for complete search history.

(56) References Cited

U.S. PATENT DOCUMENTS 7,100,147 B2   8/2006 Miller et al.
7,448,022 B1 * 11/2008 Ram ........................ G06F 8/00
                                                     717/120
(Continued)

FOREIGN PATENT DOCUMENTS

KR        101282798 B1    7/2013
WO      2010010992 A1    1/2010
(Continued)

OTHER PUBLICATIONS

Abouelhoda, 2012, Tavaxy: integrating Taverna and Galaxy workflows with cloud computing support, BMC Bioinformatics 13:77.
(Continued)

*Primary Examiner* — Dong U Kim
(74) *Attorney, Agent, or Firm* — Morgan Lewis & Bockius LLP

(57) ABSTRACT

In one aspect, a method for scheduling jobs in a computational workflow includes identifying, from a computational workflow by a workflow execution engine executing on a processor, a plurality of jobs ready for execution. The method includes sorting, based on computational resource requirements associated with each identified job, the identified jobs into a prioritized queue. The method includes provisioning one or more computational instances based on the computational resource requirements of the identified jobs in the prioritized queue, wherein at least one computational instance is provisioned based on a highest priority job in the queue. The method includes submitting the prioritized jobs for execution to the one or more computational instances.

21 Claims, 11 Drawing Sheets

(51) Int. Cl.
 *G06F 9/455* (2018.01)
 *H04L 12/24* (2006.01)
(52) U.S. Cl.
 CPC ...... *H04L 41/0806* (2013.01); *H04L 41/0896* (2013.01); *G06F 2209/5021* (2013.01)

(56) References Cited

U.S. PATENT DOCUMENTS

| | | |
|---|---|---|
| 7,451,432 B2 | 11/2008 | Shukla et al. |
| 7,577,554 B2 | 8/2009 | Lystad et al. |
| 7,620,800 B2 | 11/2009 | Huppenthal et al. |
| 7,885,840 B2 | 2/2011 | Sadiq et al. |
| 8,136,114 B1 * | 3/2012 | Gailloux ............ G06Q 10/0631 718/104 |
| 8,146,099 B2 | 3/2012 | Tkatch et al. |
| 8,639,847 B2 | 1/2014 | Blaszczak et al. |
| 9,184,988 B2 | 11/2015 | Bartlett et al. |
| 9,250,886 B2 | 2/2016 | Gnech et al. |
| 9,436,922 B2 | 9/2016 | Agarwal et al. |
| 9,519,884 B2 | 12/2016 | Aron et al. |
| 9,558,321 B2 | 1/2017 | Tijanic |
| 2002/0133504 A1 | 9/2002 | Vlahos et al. |
| 2004/0078105 A1 | 4/2004 | Moon et al. |
| 2004/0243982 A1 | 12/2004 | Robison |
| 2005/0282137 A1 | 12/2005 | Sasinowski et al. |
| 2011/0131448 A1 * | 6/2011 | Vasil ............ G06F 9/5038 714/19 |
| 2012/0278513 A1 * | 11/2012 | Prevost ............ G06F 9/5038 710/39 |
| 2013/0232480 A1 | 9/2013 | Winterfeldt et al. |
| 2013/0332081 A1 | 12/2013 | Reese et al. |
| 2014/0200147 A1 | 7/2014 | Bartha et al. |
| 2014/0281708 A1 | 9/2014 | Adam et al. |
| 2015/0020061 A1 | 1/2015 | Ravi |
| 2015/0066381 A1 | 3/2015 | Kural |
| 2015/0066383 A1 | 3/2015 | Wernicke |
| 2015/0161536 A1 | 6/2015 | Mikheev |
| 2016/0011905 A1 | 1/2016 | Mishra et al. |
| 2016/0103659 A1 * | 4/2016 | Tijanic ............ G06F 8/34 717/115 |
| 2016/0216991 A1 * | 7/2016 | Ansari ............ G06F 9/45558 |
| 2016/0313874 A1 | 10/2016 | Mikheev |
| 2016/0335582 A1 * | 11/2016 | Suntinger ...... G06Q 10/063112 |
| 2017/0199764 A1 | 7/2017 | Tijanic et al. |
| 2018/0011737 A1 * | 1/2018 | Scheuer ............ G06F 9/4881 |
| 2018/0053328 A1 * | 2/2018 | Simonovic ............ G06F 8/433 |
| 2018/0143858 A1 * | 5/2018 | Sanjabi ............ G06F 9/5011 |
| 2018/0332138 A1 * | 11/2018 | Liu ............ H04L 41/5041 |

FOREIGN PATENT DOCUMENTS

| | | | |
|---|---|---|---|
| WO | 2013035904 A1 | 3/2013 | |
| WO | 2016060910 A1 | 4/2016 | |
| WO | WO-2016060910 A1 * | 4/2016 | ............ G16B 20/00 |
| WO | 2016182578 A1 | 11/2016 | |

OTHER PUBLICATIONS

Agarwal, 2013, SINNET: Social Interaction Network Extractor from Text, Proc IJCNLP 33-36.
Balhajjame et al., Using a suite of ontologies for preserving workflow-centric research objects, Web Semantics: Science, Services, and Agents on the World Wide Web, 2015, 16-42.
Cock, 2013, Galaxy tools and workflows for sequence analysis with applications in molecular plant pathology, Peer J 1: e167.
Cohen-Boulakia, 2014, Distilling structure in Taverna scientific workflows: a refactoring approach, BMC Bioinformatics 15(Suppl 1):S12.
Cromwell: A Workflow Management System geared towards scientific workflows. Available at: https://github.com/broadinstitute/cromwell/blob/29_hotfix/README.md. Accessed Sep. 26, 2017.
Deelman et al., Pegasus, a workflow management system for science automation, Future Generation Computer Systems, 2015, 17-35.
Delcher, 1999, Alignment of whole genomes, Nucl. Acids Res 27(11):2369-76.
Dinov, 2011, Applications of the pipeline environment for visual informatics and genomic computations, BMC Bioinformatics 12:304.
Dinov, 2014, The perfect neuroimaging-genetics-computation storm: collision of petabytes of data, millions of hardware devices and thousands of software tools, Brain Imaging and Behavior 8:311-322.
Dudley, 2009, A quick guide for developing effective bioinformatics programming skits, PLoS Comput Biol 5(12): e1000589.
Durham, 2005, EGene: a configurable pipeline system for automated sequence analysis, Bioinformatics 21 (12):2812-2813.
Fiers, 2008, High-throughput Bioinformatics with the Cyrille2 Pipeline System, BMC Bioinformatics 9:96.
Goecks et al., Galaxy: a comprehensive approach for supporting accessible, reproducible, and transparent computational research in the life sciences, Genome Biology, 2010.
Guo, A workflow task scheduling algorithm based on the resources' fuzzy clustering in cloud computing environment, International Journal of Communication Systems (Abstract only), 2015, 28:1053-1067.
Hettne et al., Structuring research methods and data with the research object model: genomics workflows as a case study, Journal of Biomedical Semantics, 2014, 5:41.
Hokamp, 2003, Wrapping up BLAST and Other Applications for Use on Unix Clusters, Bioinformatics 19(3)441-42.
Hoon, 2003, Biopipe: A flexible framework for protocol-based bioinformatics analysis, Genome Res 13(8):1904-1915.
Hull, 2006, Taverna: a tool for building and running workflows of services, Nucl Acids Res 34(Web Server issue): W729-32.
International Search Report and Written Opinion dated Jan. 5, 2016, for International Patent Application PCT/US2015/054461 with International Filing Date Oct. 7, 2015, (7 pages).
Kano, 2010, Text mining meets workflow: linking U-Compare with Taverna, Bioinformatics 26(19):2486-7.
Kanwal et al., Challenges of large-scale biomedical workflows on the cloud—a case study on the need for reproducibility of results, Computer-Based Medical Systems (CBMS), 2015 IEEE 28th International Symposium, 2015.
Kaushik et al., Rabix: an open-source workflow executor supporting recomputability and interoperability of workflow descriptions, Pac Symp Biocomput, 2016, 22:154-165.
Kawas, 2006, BioMoby extensions to the Taverna workflow management and enactment software, BMC Bioinformatics 7:523.
Koster et al., Snakemake—a scalable bioinforrnatics workflow engine, Bioinforrnatics, 2012, vol. 28, No. 19, pp. 2520-1522.
Krabbenhoft, 2008, Integrating ARC grid middleware with Taverna workflows, Bioinformatics 24(9):1221-2.
Kuhn, 2010, CDK-Taverna: an open workflow environment for cheminformatics, BMC Bioinformatics 11:159.
Kurs et al., Nextflow Workbench: Reproducible and Reusable Workflows for Beginners and Experts, bioRxiv, 2016.
Lanzen, 2008, The Taverna interaction Service: enabling manual interaction in workflows, Bioinformatics 24 (8):1118-20.
Leipzig, A review of bioinformatic pipeline frameworks, Briefings in Bioinformatics, 2017, 18(3), 530-536.
Li, 2008, Automated manipulation of systems biology models using libSBML within Taverna workflows, Bioinformatics 24(2):287-9.
Li, 2008, Performing statistical analyses on quantitative data in Taverna workflows: an example using R and maxdBrowse to identify differentially-expressed genes from microarray data, BMC Bioinformatics 9:334.
Li, 2010, A survey of sequence alignment algorithms for next-generation sequencing, Briefings in Bionformatics 11 (5):473-483.
Machine translation of KR 10-1282798 B1 generated on Jan. 6, 2016, by the website of the European Patent Office (23 pages).
Machine translation produced on Jun. 1, 2015, by Espacenet of WO 2010/010992 A1 (11 pages).
Machine translation produced on Jun. 1, 2015, by WPIO website of WO 2013/035904 (10 pages).

(56) References Cited

OTHER PUBLICATIONS

McKenna, 2010, The Genome Analysis Toolkit: a MapReduce framework for analyzing next-generation DNA sequencing data, Genome Res 20(9):1297-1303.
Missier, 2010, Taverna, reloaded, Proc. Scientific and Statistical Database Management, 22nd Int Conf, Heidelberg, Germany, Jun./Jul. 2010, Gertz & Ludascher, Eds., Springer.
Nenadic, 2010, Nested Workflows, The Taverna Knowledge Blog, Dec. 13, 2010. Retrieved on Feb. 25, 2016 from http://taverna.knowledgeblog.org/2010/12/13/nested-workflows/.
O'Driscoll et al. 'Big Data,' Hadoop and cloud computing in genomics, 2013, pp. 774-781, vol. 46, Journal of Biomedical Informatics.
Oinn, 2004, Taverna: a tool for the composition and enactment of bioinformatics workflows, Bioinformatics 20 (17):3045-54.
Oinn, 2006, Taverna: lessons in creating a workflow environment for the life sciences, Concurrency and Computation: Practice and Experience 18(10):1067-1100.
O'Rawe, 2013, Low Concordance of Multiple Variant-Calling Pipelines: Practical Implications for Exome and Genome Sequencing, Genome Med 5:28.
Pabinger, 2013, A survey of tools for variant analysis of next-generation genome sequencing data, Brief Bioinf.
Paterson, 2009, An XML transfer schema for exchange of genomic and genetic mapping data: implementation as a web service in a Taverna workflow, BMC Bioinformatics 10:252.
Peng, Reproducible Research in Computational Science, Science, Dec. 2, 2011, 334(6060), 1226-1227.
Potter, 2004, The ensemble analysis pipeline, Genome Res 14:934-941.
Ramirez-Gonzalez, 2011, Gee Fu: a sequence version and web-services database tool for genomic assembly, genome feature and NGS data, Bioinformatics 27(19):2754-2755.
Rex, 2003, The LONI Pipeline Processing Environment, Neuroimage 19: 1033-1048.
Sandve et al., Ten Simple Rules for Reproducible Computational Research, PLoS Computational Biology, Oct. 2013, vol. 9, Issue 10, e1003285.
Schenk, 2013, A pipeline for comprehensive and automated processing of electron diffraction data in IPLT, J Struct Biol 182(2):173-185.
Sroka, 2006, XQTav: an XQuery processor for Taverna environment, Bioinformatics 22(10):1280-1.
Sroka, 2010, a formal semantics for the Taverna 2 workflow model, J Comp Sys Sci 76(6):490-508.
Sroka, 2011, CalcTav—integration of a spreadsheet and Taverna workbench, Bioinformatics 27(18):2618-9.
Stallman, GNU Make: A Program for Directing Recompilation, Free Software Foundation, Inc., Jul. 2002.
Tan, 2010, A Comparison of Using Taverna and BPEL in Building Scientific Workflows: the case of caGrid, Concurr Comput 22(9):1096-1117.
Tan, 2010, CaGrid Workflow Toolkit: a Taverna based workflow tool for cancer grid, BMC Bioinformatics 11:542.
Terstyanszky et al., Enabling scientific workflow sharing through coarse-grained interoperability, Future Generation Computer Systems, 2014, 37, 46-59.
The Free Dictionary.com, Article about Client-server system originally from IGEL Technologies (2009) entitled: White Paper Cloud Computing: Thin clients in the cloud, Oct. 20, 2016 retrieval date; pp. 1-2.
The Free Dictionary.com, Article about Cloud computing originally from The Columbia Electronic Encyclopedia (2013) Oct. 20, 2016 retrieval date; Columbia Univ. Press—pp. 1-3.
Torri, 2012, Next generation sequence analysis and computational genomics using graphical pipeline workflows, Genes (Basel) 3(3):545-575.
Truszkowski, 2011, New developments on the cheminformatics open workflow environment CDK-Taverna, J Cheminform 3:54.
Turi, 2007, Taverna Workflows: Syntax and Semantics, IEEE Int Conf on e-Science and Grid Computing 441-448.
Vivian et al., Rapid and efficient analysis of 20,000 RNA-seq samples with Toil, bioRxiv, 2016.
Warneke et al., Nephele: Efficient Parallel Data Processing in the Cloud, ACM, 2009.
Wassink, 2009, Using R in Taverna: RShell v1.2. BMC Res Notes 2:138.
Wen, 2012, Comparison of Open-Source Cloud Management Platforms: OpenStack and OpenNebula, 9th International Conference on Fuzzy Systems and Knowledge Discovery.
Woistencroft, 2005, Panoply of Utilities in Taverna, Proc 2005 1st Int Conf e-Science and Grid Computing 156-162.
Woistencroft, 2013, The Taverna Workflow Suite: Designing and Executing Workflows of Web Services on the Desktop, Web or in the Cloud, Nucl Acids Res 41(W1):W556-W561.
Yildiz, 2014, BIFI: a Taverna piugin for a simplified and user-friendly workflow platform, BMC Res Notes 7:740.
Yu, 2007, A tool for creating and parallelizing bioinformatics pipelines, DOD High Performance Computing Conf 417-420.
Zhang, 2013, Taverna Mobile: Taverna workflows on Android, EMBnet J 19(B):43-45.
Zhao, 2012, Why Workflows Break—Understanding and Combating Decay in Taverna Workflows, eScience 2012, Chicago, Oct. 2012.

\* cited by examiner

400

```
┌─────────────────────────────────────┐
│ Identifying, from a description of a computational │
│ workflow, a plurality of jobs ready for execution │
│                                 402 │
└─────────────────────────────────────┘
                  ↓
┌─────────────────────────────────────┐
│ Sorting, based on computational resource │
│ requirements associated with each job, the identified │
│ jobs into a prioritized queue │
│                                 404 │
└─────────────────────────────────────┘
                  ↓
┌─────────────────────────────────────┐
│ Provisioning one or more computational instances │
│ based on the computational resource requirements of │
│ the identified jobs in the prioritized queue, wherein at │
│ least one computational instance is provisioned based │
│ on a highest priority job in the queue │
│                                 406 │
└─────────────────────────────────────┘
                  ↓
┌─────────────────────────────────────┐
│ Submitting the prioritized jobs for execution to the one │
│ or more computational instances │
│                                 408 │
└─────────────────────────────────────┘
```

*FIG. 4A*

SYSTEMS AND METHODS FOR SCHEDULING JOBS FROM COMPUTATIONAL WORKFLOWS

RELATED APPLICATIONS

This application claims priority to U.S. Provisional Patent Application Ser. No. 62/514,143, filed on Jun. 2, 2017, the contents of which are hereby incorporated by reference in its entirety.

FIELD

Aspects of the technology described herein relate to systems and methods for scheduling jobs from computational workflows in cloud computing environments.

BACKGROUND

The completion of the first human reference genome enabled the discovery of the whole catalogue of human genes, ushering in a new era of genomics research to discover the molecular basis of disease. More recently, so-called next generation sequencing (NGS) technologies can now routinely sequence entire genomes within days and for a low cost. The number of fully sequenced genomes continues to grow, and with it our understanding of human genetic variation. For example, the 1000 Genomes Project is an international collaboration that seeks to provide a comprehensive description of common human genetic variation by performing whole-genome sequencing of a diverse set of individuals from multiple populations. To that end, the 1000 Genomes Project has sequenced the genomes of over 2,500 unidentified people from about 25 populations around the world. See "A global reference for human genetic variation", Nature 526, 68-74 (2015). This has led to new insights regarding the history and demography of ancestral populations, the sharing of genetic variants among populations, and the role of genetic variation in disease. Further, the sheer number of genomes has greatly increased the resolution of genome wide association studies, which seek to link various genetic traits and diseases with specific genetic variants.

The path from sequencer output to scientifically and clinically significant information can be difficult even for a skilled geneticist or an academic researcher. Sequencer output is typically in the form of data files for individual sequence reads. Depending on the project goals, these reads may need to be quality checked, assembled, aligned, compared to the literature or to databases, segregated from one another by allele, evaluated for non-Mendelian heterozygosity, searched for known or novel variants, or subject to any of many other analyses. Such analytical processes are often modelled as computational workflows, in which the outputs of one step (e.g., software that performs quality checking) are provided as an input to another (e.g., software that performs sequence alignment).

Today, computational workflows are commonly used in many bioinformatics and genomics analyses. Computational workflows may consist of dozens of tools with hundreds of parameters to handle a variety of use cases and data types. Further, these workflows may be batched together and run on thousands to millions of samples. Various computational workflow systems exist, including Taverna and the Graphical Pipeline for Computational Genomics (GPCG). See Wolstencroft et al., "The Taverna workflow suite: designing and executing workflows of Web Services on the desktop, web or in the cloud," Nucleic Acids Research, 41(W1): W557-W561 (2013); Torri et al., "Next generation sequence analysis and computational genomics using graphical pipeline workflows," Genes (Basel). 2012 Aug. 30; 3(3):545-75 (2012).

Such computational workflow systems have conventionally been installed on locally available high performance servers, allowing end users to offload the processing of their workflows from a client device. More recently, computational workflow systems have been deployed in cloud-based computing environments, which allow for the rapid and scalable deployment of computing resources to accommodate computational workflows of any size. However, as the complexity of an individual workflow increases to handle a variety of use cases or criteria, it becomes more challenging to optimally compute with it. For example, computational workflows may include a variety of work items, or jobs, to perform, such as whole genome alignment, variant calling, and quality control, which may in some cases be run concurrently. Each of these jobs may require different levels of computational resources, compounding the ability to optimally process workflows given accessible resources. As a result of the increasing volume of biomedical data, analytical complexity, and the scale of collaborative initiatives focused on data analysis, the efficiency of the analysis of biomedical data has become a significant concern. Accordingly, there is a need for improvements in computational workflow execution.

BRIEF SUMMARY

In one aspect, a method for scheduling jobs in a computational workflow includes identifying, from a computational workflow by a workflow execution engine executing on a processor, a plurality of jobs ready for execution. The method includes sorting, based on computational resource requirements associated with each identified job, the identified jobs into a prioritized queue. The method includes provisioning one or more computational instances based on the computational resource requirements of the identified jobs in the prioritized queue, wherein at least one computational instance is provisioned based on a highest priority job in the queue. The method includes submitting the prioritized jobs for execution to the one or more computational instances.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 4A is a flow diagram depicting one embodiment of a method of processing a computational workflow;

DETAILED DESCRIPTION

Embodiments of the disclosure describe novel systems and methods for scheduling jobs from computational workflows using various computing environments. For example, embodiments described herein can optimize the efficiency and cost of processing of computational workflows by sorting jobs according to their resource requirements, provisioning a computational instance according to a job with a highest resource requirement, and then executing that job and remaining jobs on that instance according to a first-fit-decreasing strategy. By provisioning an instance based on the job with the highest resource requirements, subsequent jobs with less resource requirements are likely to be combined or "packed" most efficiently onto that instance. The result is an improvement in processing speed and efficient use of resources that represents a significant technological improvement over conventional workflow processing systems.

In some embodiments, the methods and systems described herein provide functionality for scheduling executable jobs from computational workflows. For example, the methods and systems described herein may provide functionality for solving the problem of scheduling executable jobs from computational workflows on dynamically allocated and/or heterogeneous computational resources, such as computational resources available from cloud computing environments. In one of these embodiments, the system may include a scheduling service that dynamically allocates computational resources based on an evaluation of the computational resource requirements of a plurality of jobs. In this embodiment, the system may allocate a computational resource based on a job having a highest resource requirement, and then attempt to execute the remaining jobs on the allocated computational resource.

Further, the detailed description set forth below in connection with the appended drawings is intended as a description of embodiments and does not represent the only forms which may be constructed and/or utilized. However, it is to be understood that the same or equivalent functions and sequences may be accomplished by different embodiments that are also intended to be encompassed within the spirit and scope of the disclosure.

In some embodiments, the methods and systems described herein provide functionality for scheduling jobs from computational workflows to execute on computational resources. Before describing these methods and systems in detail, however, a description is provided of a network in which such methods and systems may be implemented.

Figure 1A:
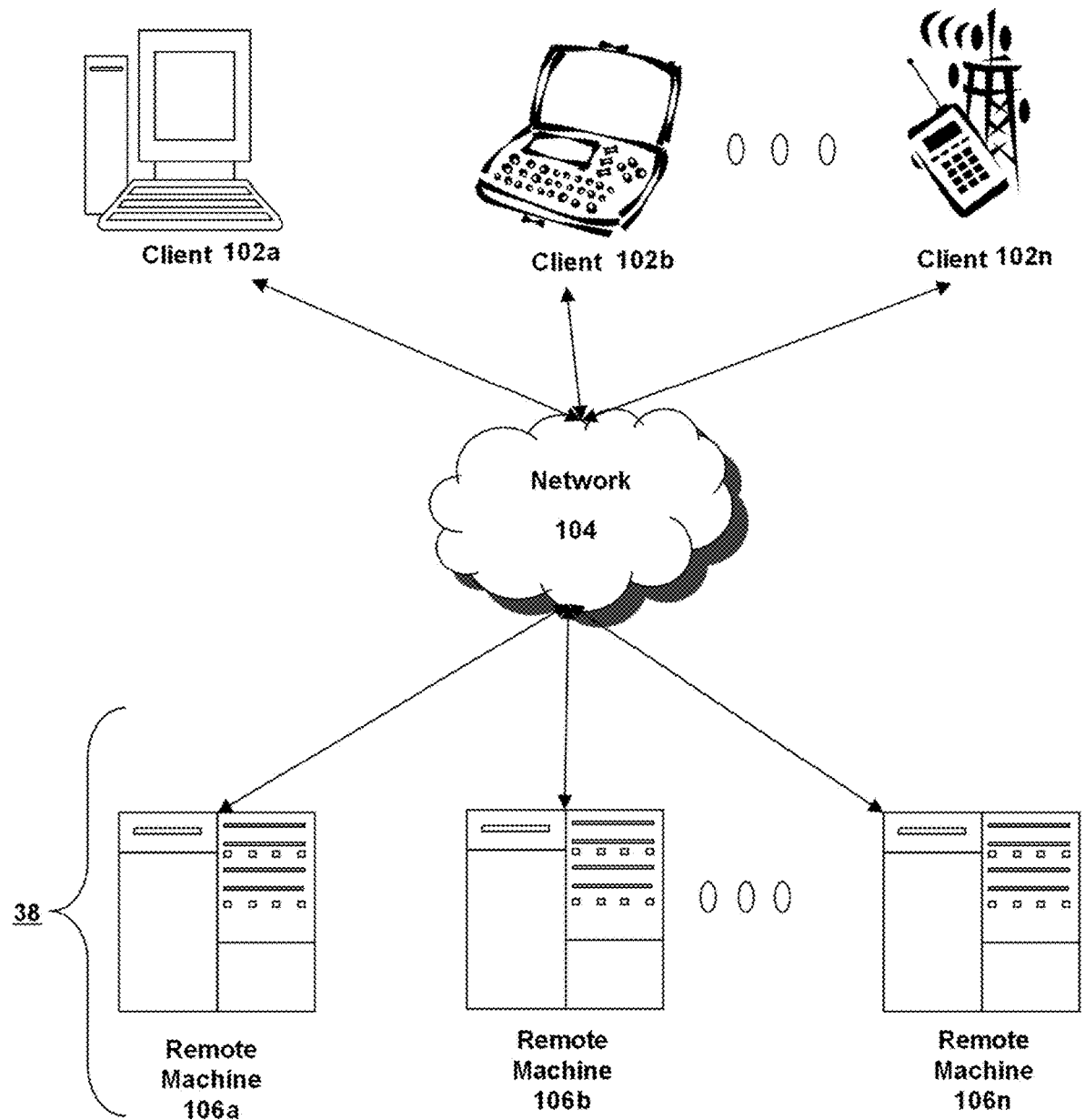
FIGS. 1A-C are block diagrams depicting embodiments of computers useful in connection with the methods and systems described herein.

Referring now to FIG. 1A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106 or computing device(s) 106) via one or more networks 104.

Although FIG. 1A shows a network 104 between the clients 102 and the remote machines 106, the clients 102 and the remote machines 106 may be on the same network 104. The network 104 can be a local area network (LAN), such as a company Intranet, a metropolitan area network (MAN), or a wide area network (WAN), such as the Internet or the World Wide Web. In some embodiments, there are multiple networks 104 between the clients 102 and the remote machines 106. In one of these embodiments, a network 104' (not shown) may be a private network and a network 104 may be a public network. In another of these embodiments, a network 104 may be a private network and a network 104' a public network. In still another embodiment, networks 104 and 104' may both be private networks.

The network 104 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 104 may comprise a wireless link, such as an infrared channel or satellite band. The topology of the network 104 may be a bus, star, or ring network topology. The network 104 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 102 and a remote machine 106 (referred to generally as computing devices 100) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 102 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 102.

In one embodiment, a computing device 106 provides the functionality of a web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm. In another of these embodiments, the server farm may be administered as a single entity.

Figure 1B:
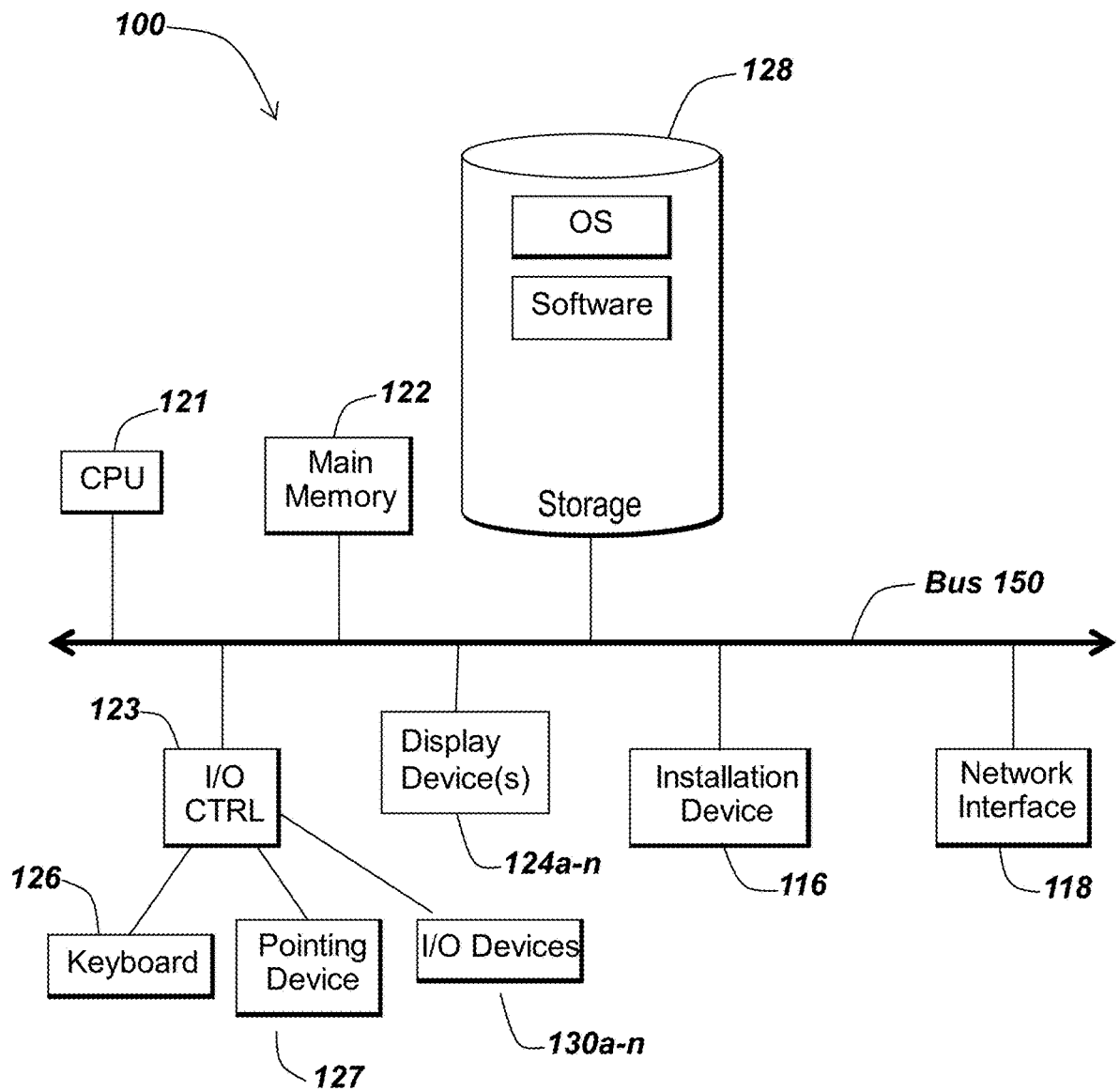
Figure 1C:
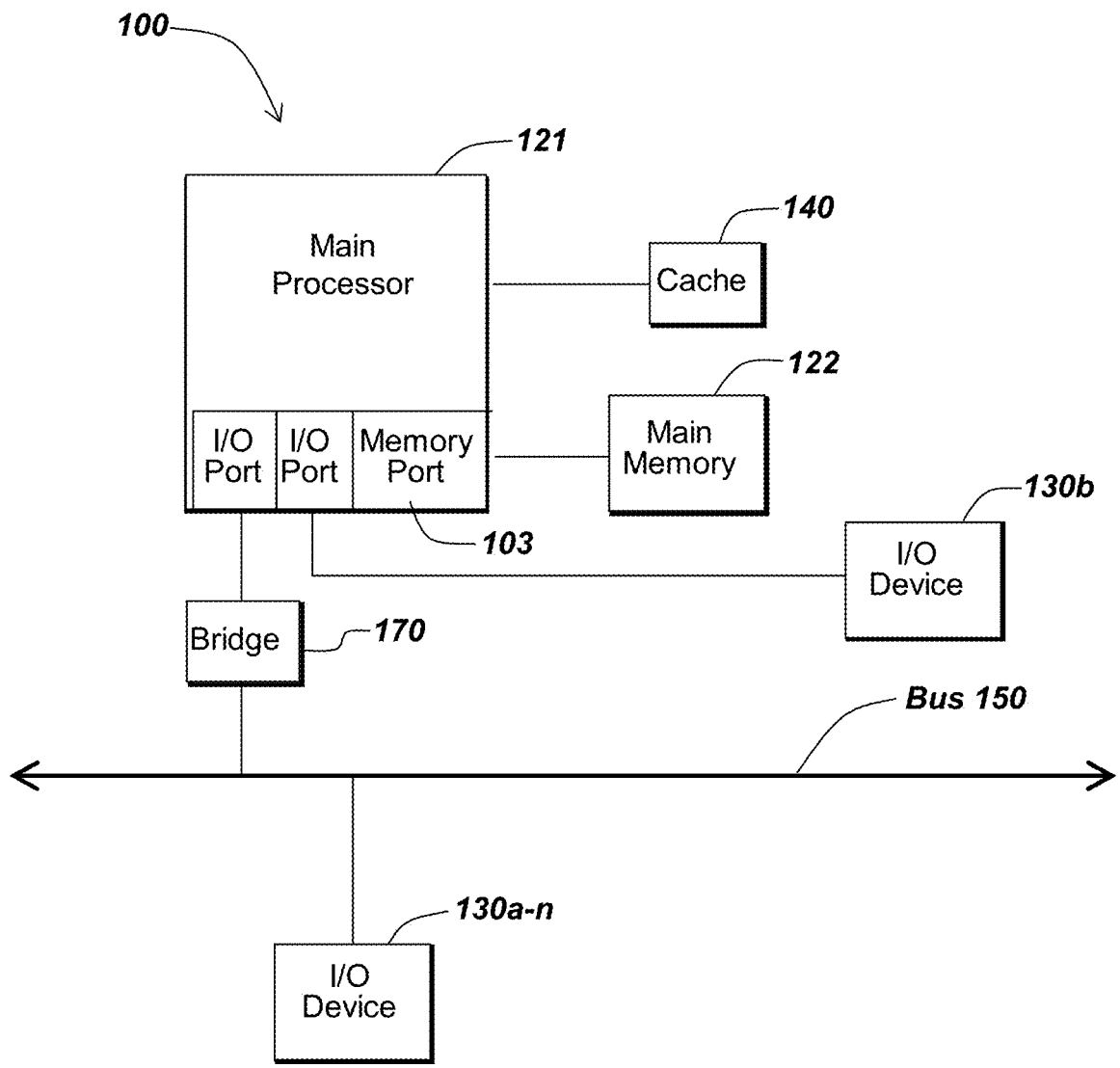

FIGS. 1B and 1C depict block diagrams of a computing device 100 useful for practicing an embodiment of the client 102 or a remote machine 106. As shown in FIGS. 1B and 1C, each computing device 100 includes a central processing unit 121, and a main memory unit 122. As shown in FIG. 1B, a computing device 100 may include a storage device 128, an installation device 116, a network interface 118, an I/O controller 123, display devices 124a-n, a keyboard 126, a pointing device 127, such as a mouse, and one or more other I/O devices 130a-n. The storage device 128 may include, without limitation, an operating system and software. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 122 may be one or more memory chips capable of storing data and allowing any storage location to be directly accessed by the microprocessor 121. The main memory 122 may be based on any available memory chips capable of operating as described herein. In the embodiment shown in FIG. 1B, the processor 121 communicates with main memory 122 via a system bus 150. FIG. 1C depicts an embodiment of a computing device 100 in which the processor communicates directly with main memory 122 via a memory port 103. FIG. 1C also depicts an embodiment in which the main processor 121 communicates directly with cache memory 140 via a secondary bus, sometimes referred to as a backside bus. In other embodiments, the main processor 121 communicates with cache memory 140 using the system bus 150.

In the embodiment shown in FIG. 1B, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with the display 124. FIG. 1C depicts an embodiment of a computer 100 in which the main processor 121 also communicates directly with an I/O device 130b via, for example, HYPERTRANSPORT, RAPIDIO, or INFINIBAND communications technology.

A wide variety of I/O devices 130a-130n may be present in the computing device 100. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 123 as shown in FIG. 1B. Furthermore, an I/O device may also provide storage and/or an installation medium for the computing device 100. In some embodiments, the computing device 100 may provide USB connections (not shown) to receive handheld USB storage devices such as the USB Flash Drive line of devices manufactured by Twintech Industry, Inc. of Los Alamitos, Calif.

Referring still to FIG. 1B, the computing device 100 may support any suitable installation device 116, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 100 may provide functionality for installing software over a network 104. The computing device 100 may further comprise a storage device, such as one or more hard disk drives or redundant arrays of independent disks, for storing an operating system and other software. Alternatively, the computing device 100 may rely on memory chips for storage instead of hard disks.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 100 communicates with other computing devices 100' via any type and/or form of gateway or tunneling protocol such as Secure Socket Layer (SSL) or Transport Layer Security (TLS). The network interface 118 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In some embodiments, the computing device 100 may comprise or be connected to multiple display devices 124a-124n, each of which may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc., of Raleigh, N.C.; Ubuntu, a freely-available operating system distributed by Canonical Ltd. of London, England; or any type and/or form of a Unix operating system, among others.

The computing device 100 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 100 is a mobile device, such as a JAVA-enabled cellular telephone/smartphone or personal digital assistant (PDA). The computing device 100 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 100 is a digital audio player. In one of these embodiments, the computing device 100 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 100 is a digital audio player such as those manufactured by, for example, and without limitation, Samsung Electronics America of Ridgefield Park, N.J., or Creative Technologies Ltd. of Singapore. In yet other embodiments, the computing device 100 is a portable media player or digital audio player supporting file formats including, but not limited to, MP3, WAV, M4A/AAC, WMA Protected AAC, AEFF, Audible audiobook, Apple Lossless audio file formats, and .mov, .m4v, and .mp4 MPEG-4 (H.264/MPEG-4 AVC) video file formats.

In some embodiments, the computing device 100 comprises a combination of devices, such as a mobile phone combined with a digital audio player or portable media player. In one of these embodiments, the computing device 100 is a device in the Google/Motorola line of combination digital audio players and mobile phones. In another of these embodiments, the computing device 100 is a device in the IPHONE smartphone line of devices manufactured by Apple Inc. In still another of these embodiments, the computing device 100 is a device executing the ANDROID open source mobile phone platform distributed by the Open Handset Alliance; for example, the device 100 may be a device such as those provided by Samsung Electronics of Seoul, Korea, or HTC Headquarters of Taiwan, R.O.C. In other embodiments, the computing device 100 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Figure 1D:
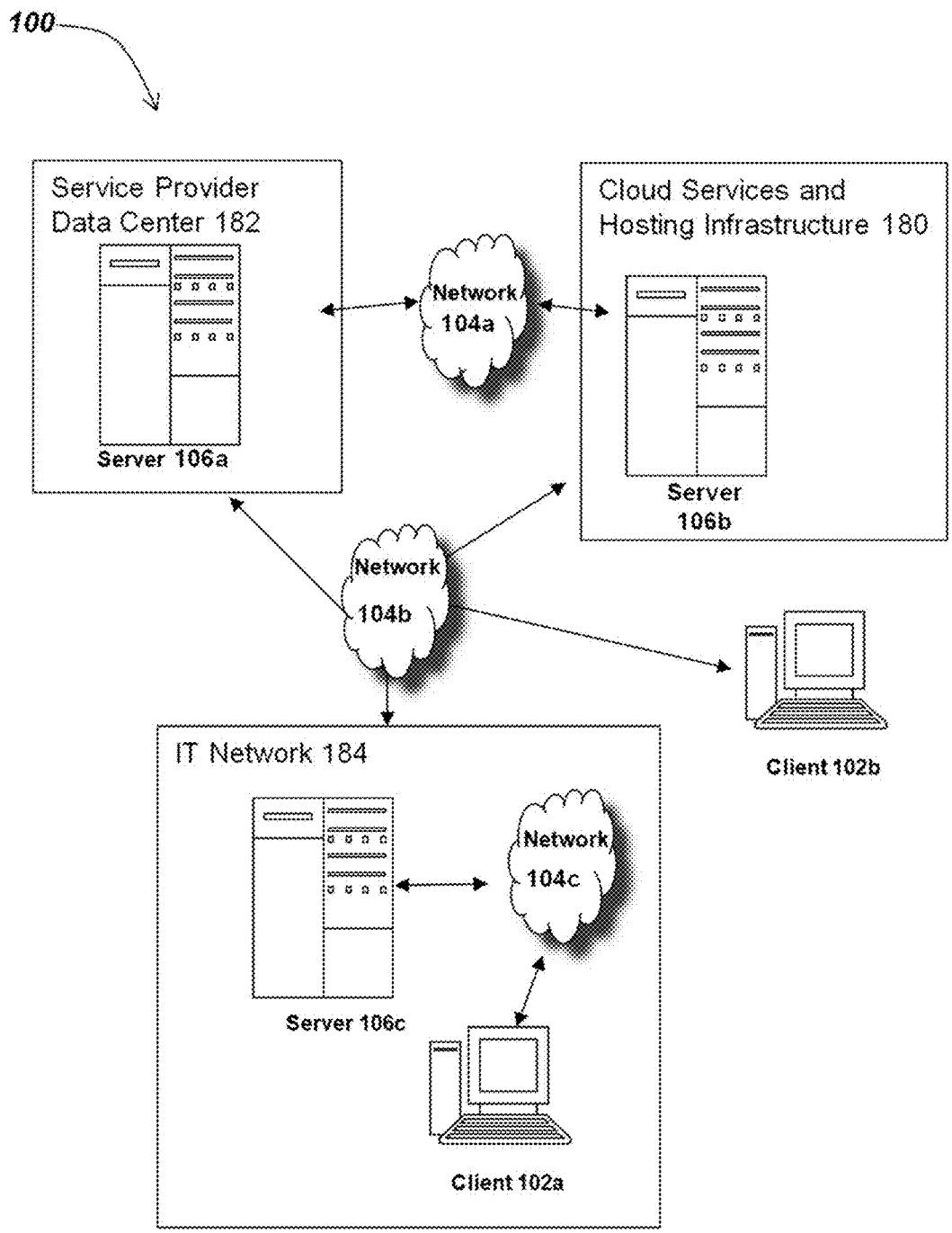
FIG. 1D is a block diagram depicting one embodiment of a system in which a plurality of networks provides data hosting and delivery services.

Referring now to FIG. 1D, a block diagram depicts one embodiment of a system in which a plurality of networks provides hosting and delivery services. In brief overview, the system includes a cloud services and hosting infrastructure 180, a service provider data center 182, and an information technology (IT) network 184.

In one embodiment, the data center 182 includes computing devices such as, without limitation, servers (including, for example, application servers, file servers, databases, and backup servers), routers, switches, and telecommunications equipment. In another embodiment, the cloud services and hosting infrastructure 180 provides access to, without limitation, storage systems, databases, application servers, desktop servers, directory services, web servers, as well as services for accessing remotely located hardware and software platforms. In still other embodiments, the cloud services and hosting infrastructure 180 includes a data center 182. In other embodiments, however, the data center 182 relies on services provided by a third-party cloud services and hosting infrastructure 180.

In some embodiments, the IT network 104c may provide local services, such as mail services and web services. In other embodiments, the IT network 104c may provide local versions of remotely located services, such as locally-cached versions of remotely-located print servers, databases, application servers, desktop servers, directory services, and web servers. In further embodiments, additional servers may reside in the cloud services and hosting infrastructure 180, the data center 182, or other networks altogether, such as those provided by third-party service providers including, without limitation, infrastructure service providers, application service providers, platform service providers, tools service providers, web site hosting services, and desktop service providers.

In one embodiment, a user of a client 102 accesses services provided by a remotely located server 106*a*. For instance, an administrator of an enterprise IT network 184 may determine that a user of the client 102*a* will access an application executing on a virtual machine executing on a remote server 106*a*. As another example, an individual user of a client 102*b* may use a resource provided to consumers by the remotely located server 106 (such as email, fax, voice or other communications service, data backup services, or other service).

As depicted in FIG. 1D, the data center 182 and the cloud services and hosting infrastructure 180 are remotely located from an individual or organization supported by the data center 182 and the cloud services and hosting infrastructure 180; for example, the data center 182 may reside on a first network 104*a* and the cloud services and hosting infrastructure 180 may reside on a second network 104*b*, while the IT network 184 is a separate, third network 104*c*. In other embodiments, the data center 182 and the cloud services and hosting infrastructure 180 reside on a first network 104*a* and the IT network 184 is a separate, second network 104*c*. In still other embodiments, the cloud services and hosting infrastructure 180 resides on a first network 104*a* while the data center 182 and the IT network 184 form a second network 104*c*. Although FIG. 1D depicts only one sever 106*a*, one server 106*b*, one server 106*c*, two clients 102, and three networks 104, it should be understood that the system may provide multiple ones of any or each of those components. The servers 106, clients 102, and networks 104 may be provided as described above in connection with FIGS. 1A-1C.

Therefore, in some embodiments, an IT infrastructure may extend from a first network—such as a network owned and managed by an individual or an enterprise—into a second network, which may be owned or managed by a separate entity than the entity owning or managing the first network. Resources provided by the second network may be said to be "in a cloud." Cloud-resident elements may include, without limitation, storage devices, servers, databases, computing environments (including virtual machines, servers, and desktops), and applications. For example, the IT network 184 may use a remotely located data center 182 to store servers (including, for example, application servers, file servers, databases, and backup servers), routers, switches, and telecommunications equipment. As another example, the cloud-resident elements may include mountable storage such as, without limitation, an AMAZON Elastic Block Storage (EBS) provided by Amazon Web Services, Inc. of Seattle, Wash. The data center 182 may be owned and managed by the IT network 184 or a third-party service provider (including for example, a cloud services and hosting infrastructure provider) may provide access to a separate data center 182.

In some embodiments, one or more networks providing computing infrastructure on behalf of customers is referred to as a cloud. In one of these embodiments, a system in which users of a first network access at least a second network including a resource pool of abstracted, scalable, and managed computing resources capable of hosting resources may be referred to as a cloud computing environment. In another of these embodiments, resources may include, without limitation, virtualization technology, data center resources, applications, and management tools. In some embodiments, Internet-based applications (which may be provided via a "software-as-a-service" model) may be referred to as cloud-based resources. In other embodiments, networks that provide users with computing resources, such as remote servers, virtual machines, or blades on blade servers, may be referred to as compute clouds or "infrastructure-as-a-service" providers. In still other embodiments, networks that provide storage resources, such as storage area networks, may be referred to as storage clouds. In further embodiments, a resource may be cached in a local network and stored in a cloud.

In some embodiments, some or all of a plurality of remote machines 106 may be leased or rented from third-party companies such as, by way of example and without limitation, Amazon Web Services, Inc.; Rackspace US, Inc. of San Antonio, Tex.; Microsoft Corporation of Redmond, Wash.; and Google Inc. of Mountain View, Calif. In other embodiments, all the hosts 106 are owned and managed by third-party companies including, without limitation, Amazon Web Services, Inc., Rackspace US, Inc., Microsoft Corporation, and Google Inc. Remote machines may be virtual machines, for example.

Computing resources generally may include, without limitation, physical or virtualized computing components that users' machines 100 may access directly or over a network 104. For example, and without limitation, the computing resources may include computers 100 as described above in connection with FIGS. 1A-1D. By way of further example, the computing resources may include physical computers, virtual computers, virtual computer components (such as hard drives), physical computers (including, by way of example, blades on blade servers or other types of shared or dedicated servers), memory, network devices, databases, input/output systems, operating system software, application software, or any type of software. In other embodiments, the computing resources act as intermediaries and provide access to other remote machines. For example, a first computing resource may provide access to a second machine 106*b* that executes software made available over the network 104; by way of example, a software-as-a-service provider may execute software on a second machine 106*b* that a user can access via the first computing resource.

Figure 2:
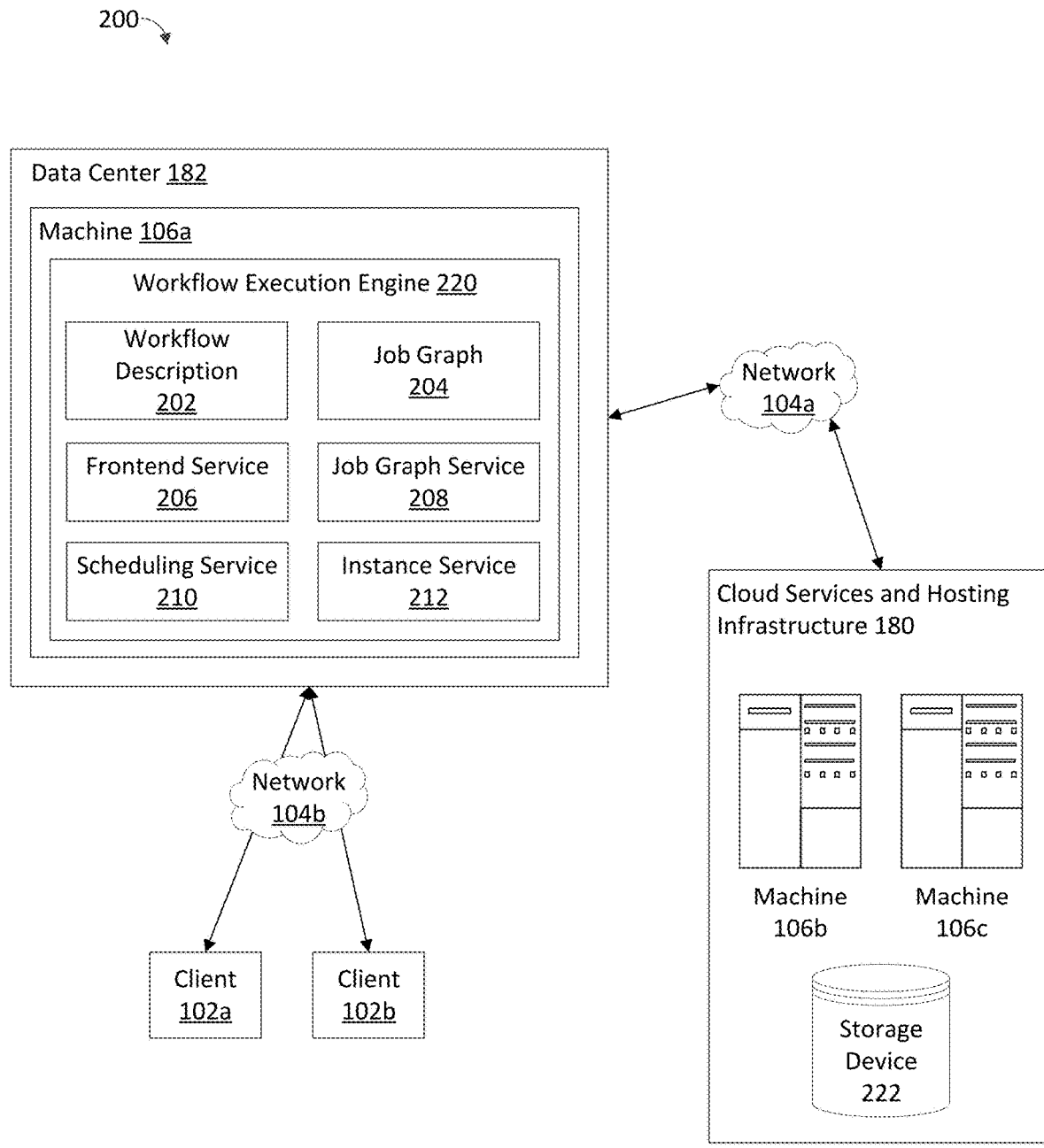
FIG. 2 is a block diagram depicting an embodiment of a system for executing computational workflows.

Referring now to FIG. 2, a block diagram depicts one embodiment of a workflow execution system 200 suitable for processing computational workflows. The workflow execution system may be used for processing a computational workflow, such as a bioinformatics or genomics workflow written using Common Workflow Language (CWL), for example. In brief overview, the workflow execution system 200 includes a network 104*a*, a network 104*b*, a cloud services and hosting infrastructure 180, and a data center 182. For example, an entity in which users execute computational workflows may include a data center providing the infrastructure needed to execute those workflows. As shown in FIG. 2, the data center 182 includes a machine 106*a* executing a workflow execution engine 220. In some embodiments, however, the workflow execution engine 220 executes on a machine 106*a* that would not be considered part of a data center; that is, the machine 106*a* executing the workflow execution engine 220 may be part of any computing or workflow processing environment.

The workflow execution engine 220 can receive a workflow description 202, which may be provided by a user or obtained from another source. The workflow description 202 can describe a computational workflow, such as a bioinformatics workflow or a genomics workflow. Computational workflows can comprise dozens of tools with hundreds of parameters to handle a variety of use cases and data types. In practice, workflows are described with machine-readable serialized data objects in either a general-purpose programming language, domain-specific language, or serialized object models for workflow description. For example, an object model-based approach may describe the steps in a workflow in JavaScript Object Notation (JSON) format with a custom syntax. Similarly, the workflow description can be written using Common Workflow Language (CWL). CWL is a specification that allows one to describe various command line tools and to connect them together to create workflows. CWL is similar to tools such as GNU "make" as it specifies an order of execution based on dependencies between tasks. However, CWL further requires that tasks be isolated and have explicit values for both inputs and outputs. More information regarding CWL can be found at http://www.commonwl.orq. Additionally, it should be noted that embodiments of the disclosure are not limited to CWL and may use a variety of formats of workflow descriptions, including Workflow Description Language (WDL), eXtensible Markup Language (XML), and the like.

Workflow descriptions typically describe a series of interconnected "steps", each of which can be a single tool (e.g., a command-line application executing in a POSIX environment) or another, previously-described, workflow. Each step in the workflow has a set of "ports" which represent data elements that are either inputs or outputs of the associated tool or workflow. A single port represents a specific data element that is required for execution of the tool, or is a product of the execution of the tool. For data elements which are passed between applications, there must be an output port from the upstream tool and a complementary input port on the downstream application.

Figure 3A:
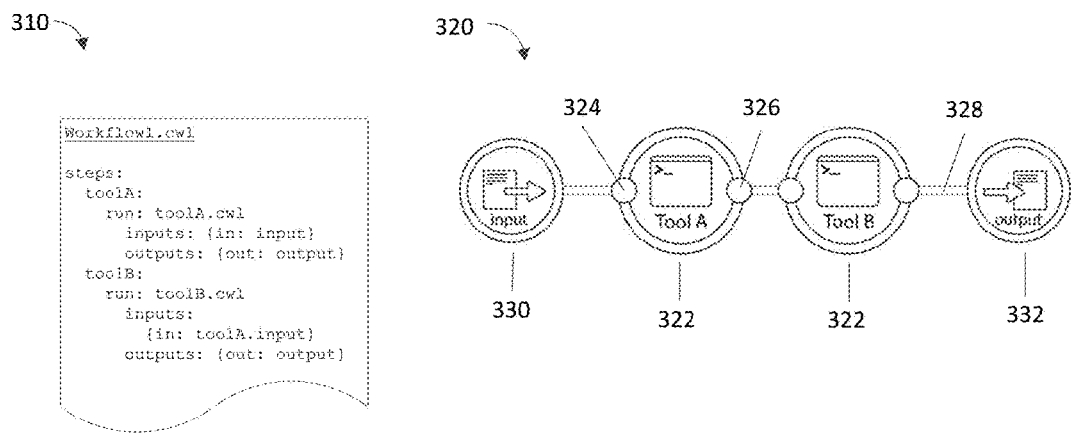
FIG. 3A is a block diagram depicting an exemplary workflow description and a corresponding workflow graph.

In this way, the workflow description 202 can be represented as a job graph 204, e.g. a directed acyclic graph (DAG) in which applications or components of the workflow become nodes, and edges indicate the flow of data elements between ports of linked tools. FIG. 3A illustrates an example of a workflow description 310 represented as a job graph 320. As shown in FIG. 3A, the workflow description 310 includes two steps that describe executing the output from a first tool A using a second tool B. A representation of the workflow description 310 as a job graph 320 includes two nodes 322 representing those tools. The nodes 322 have input ports 324 and output ports 326, which define discrete data elements, such as an input file 330, that are passed downstream along a set of edges 328 to generate a processed output 332.

Figure 3B:
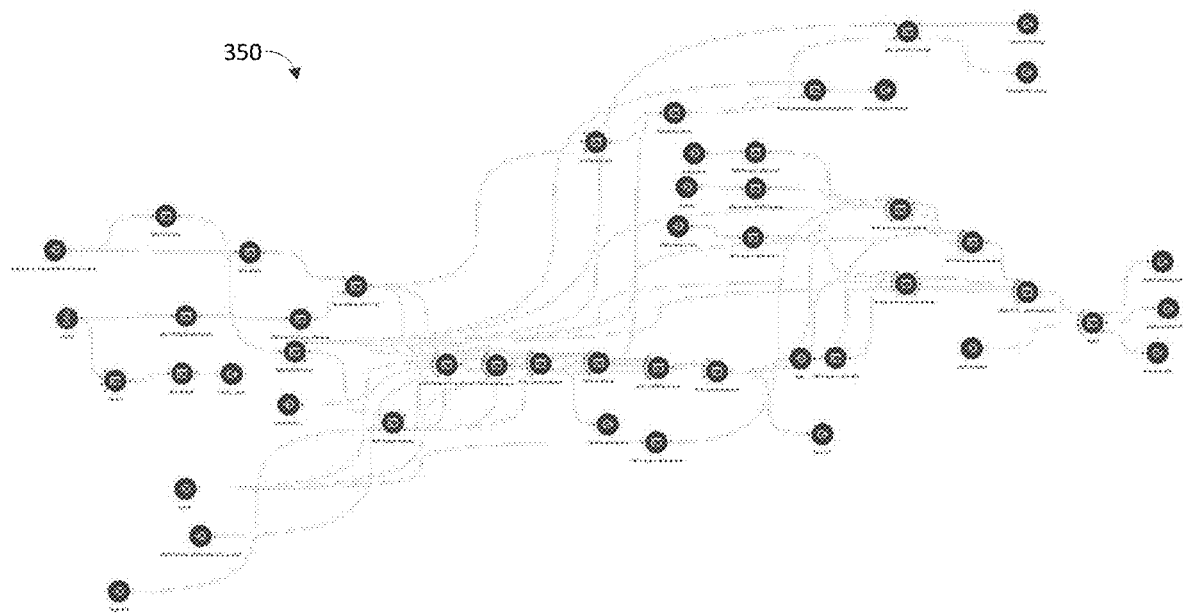
FIG. 3B depicts an exemplary workflow graph.

Of course, workflow descriptions and corresponding job graphs can be more complicated. FIG. 3B depicts an example of a job graph 350 describing a whole genome analysis to study the complete DNA sequence of an organism. One specific example of such a workflow is the Seven Bridges® "Whole Genome Analysis—BWA+GATK 2.3.9—Lite (with Metrics)" workflow, available in CWL format at https://igor.sbgenomics.com/public/apps. As shown, the job graph 350 contains dozens of interconnected tools providing various functionality related to quality control, file transformations, alignment, variant calling, and the like. Each of these tools may include specific optimizations, including the computational resource requirements of a tool, or an explicit recitation of the type of computational instance best suited for running that tool. In some cases, the workflow itself may include specific optimizations in order to obtain optimal usage of instance resources and avoid creating unnecessary processes. For example, the workflow may segment an alignment into several regions of the genome, which may individually be executed on a separate instance.

In practice, a job graph may be represented and stored in a computer memory, such as the main memory 122 of FIG. 1B. For example, a node can be a portion of the memory 122, which can include entries within a database, files or portions of one or more files within a file system, and the like. More specifically, a node can be one or more memory locations at which properties or characteristics of that node (e.g., fields associated with the associated step in the workflow description 202, such as the tool to be run and associated parameters) and references or relationships between that node and other nodes (e.g., the flow of data elements between steps) are stored. These relationships and references between nodes can be referred to as the edges of the graph. As a specific example, a node can be a portion of a memory at which a list of edges of that node (or edges adjacent to or incident upon that node) are stored.

In some embodiments, the workflow execution engine 220 can comprise a library of logical and statistical code that, when loaded into a memory and executed by a processor, receives a workflow description 202 that is submitted for execution, translates the workflow description 202 into a job graph 204, identifies one or more runnable jobs from the job graph, and schedules the one or more runnable jobs to execute on one or more computational instances. The workflow execution engine 220 can monitor executing jobs and submit additional jobs for execution until the workflow has been fully processed.

In some embodiments, the workflow execution engine 220 can include a frontend service 206. The workflow execution engine 220 may use the frontend service 206 as an entry point for workflow execution. For example, the frontend service 206 may validate a workflow that is submitted (e.g., by a client 102a) for execution. Validating a submitted workflow can include: confirming whether the associated applications or tools described by the workflow are valid; checking whether specified input parameters and files are available; determining a billing context (e.g., for the user or application); and the like. The frontend service 206 may also receive and process "start" and "stop" requests for a workflow, or determine whether a workflow should be queued given the amount of computational resources (e.g., computational instances) currently available within the computing environment.

In some embodiments, a workflow submitted for execution may also be referred to as a task. The individual units of execution within the workflow (e.g., those tools associated with the nodes of the job graph 350 of FIG. 3B) may be referred to as jobs. A task can further comprise a list of input files, i.e., a list of initial files provided with the workflow to be processed by a first set of jobs in the workflow that depend on those files. A task can further comprise a plurality of parameters for each job. In some embodiments, individual jobs may be "scattered," or parallelized, into a plurality of jobs. For example, a job that performs a whole genome analysis may be split into multiple jobs per chromosome or per data file.

In some embodiments, the workflow execution engine includes a job graph service 208, which processes tasks submitted for execution. The job graph service 208 can transform the submitted task (e.g., the workflow description 202) into a job graph 204, such as a DAG in which nodes represent jobs and edges represent the flow of data elements. The job graph service 208 may then analyze the job graph 204 in order to decompose the task into a set of nodes, or jobs, that are ready to be executed. These "runnable" jobs are those in which all of the inputs (e.g., data files) are available. Runnable jobs may then be submitted for execution. As jobs complete, their output files may be gathered and associated with the corresponding output ports of their respective nodes in the job graph 204. Gathering the output files can include uploading the output files to a data store, such as the storage device 222, for example. This in turn may allow the job graph service 208 to identify additional jobs that have become runnable by virtue of the newly completed outputs.

In some embodiments, the workflow execution engine 220 includes a scheduling service 210. The scheduling service 210 may be configured to schedule one or more runnable jobs for execution. Jobs may be submitted for execution on various computing resources, including one or more computational instances provisioned from a cloud resources provider, such as the machines 106b, 106c of the cloud services and hosting infrastructure 180. The scheduling service 210 may access the machines 106b, 106c in the cloud services and hosting infrastructure 180 over a network 104a.

In some embodiments, the scheduling service 210 may prioritize runnable jobs based on various criteria, such as the amount of computational resources (e.g., CPU, memory, disk space, duration of execution) required to process the job, or the average time in which a job is expected to complete. The scheduling service 210 may manage a set of computational instances and a corresponding queue of runnable jobs in order to efficiently schedule each of the runnable jobs on the corresponding instances. Prioritized jobs may be managed via a queue or a list data structure, for example.

In some embodiments, the scheduling service 210 may dynamically allocate and deallocate computational instances. For example, when a task is first submitted for execution, typically no computational instances have yet been allocated. Upon receiving a first runnable job, the scheduling service 210 may allocate a first computational instance (e.g., the machine 106b) in order to schedule the first runnable job on the first computational instance. Upon receiving a second runnable job, the scheduling service 210 may submit the second runnable job to execute on the first computational instance, or alternately it may allocate a second computational instance (e.g., the machine 106c) for the second job. In some cases, the second computational instance may have a different amount of computational resources than the first computational instance. Thus, the set, or "pool", of computational instances used by the scheduling service 210 may vary throughout task execution as the scheduling service 210 requests and releases computational resources.

In some embodiments, a maximum number of instances is set, preventing the scheduler to provision computational instances beyond this number. The maximum number of instances may be set per workflow or task, for example. In some embodiments, the maximum number of instances may be a single instance.

In some embodiments, the workflow execution engine 220 includes an instance service 212. The instance service 212 can obtain computational instances, i.e., a specific instance of a computing resource such as storage, CPU, memory, network bandwidth, network access, or a combination thereof, delivered through a network interface. Computational instances can be requested from the cloud services and hosting infrastructure 180, which may include providers such as Amazon (Amazon Web Services such as EC2, S3, etc.), Google Compute Platform, or Microsoft (Azure), internal providers operated as private clouds or data centers within large organizations, one or more data centers, and virtual providers. Instances requested from cloud providers may be homogenous or heterogeneous, and may be delivered in various ways such as physical or virtual servers connected to a network or a storage API. A specific example of an instance might be an Amazon EC2 "r3.8xlarge" instance that is "optimized to deliver high memory performance and high sustainable bandwidth located in the "us-east-1" region.

In some embodiments, computational instances require configuration in order to interact with the workflow execution engine 220. For example, when an instance is first allocated, any needed services, such as worker services, Docker™ services, file manipulation services, monitoring services, etc. may be installed. Once an instance has been provisioned and configured, the instance service 212 can deliver a message to the scheduling service 210 informing the scheduling service that the instance is ready to receive jobs for execution. The instance may then be added to the set of instances managed by the scheduling service 210.

In some embodiments, when a job is submitted for execution to an instance, the instance service 212 confirms that all of the input files needed to execute the job are available. If not, those input files may be provided to the service, e.g. by uploading them directly to the instance, or attaching a networked file store, such as the storage device 222. Any needed applications (e.g., the particular tool associated with the job or node) may be uploaded to the instance. One way to provide tools on instances is by packaging the tool in a Docker™ container. Depending on available resources, allocated instances may be re-used by subsequent or concurrent jobs. In these cases, the necessary applications and files may also be provided to the instance in a similar manner.

The storage device 222 may be any type or form of storage unit capable of storing data for use by one or more applications. For example, and without limitation, the storage device 222 may be a database storing bioinformatics data or a storage unit such as an AMAZON SIMPLE STORAGE SERVICE ("S3") "bucket" storing object data remotely (e.g., "in the cloud"). In some embodiments, a machine 106a that is part of a network 104b may access the storage device 222 over a second network 104a; as a result, and as understood by one of ordinary skill in the art, the storage device 222 may be said to be remotely located from the machine 106a (e.g., because the storage device 222 is part of a second network, it is said to be "remote" from the machine 106a). Additionally, the storage device 222 may be multiple storage devices, which may further be distributed across multiple cloud services and hosting infrastructures.

While this embodiment describes each of the services 206, 208, 210, 212 as performing various functions associated with processing a workflow description, it is intended that the functions performed by each service are for purposes of illustration and may, in other embodiments, be distributed in another manner. For example, in another embodiment, the scheduling service 210 may also analyze a job graph, provision instances, or validate workflow tasks. Various embodiments are considered to be within the scope of the disclosure.

Embodiments of the disclosure provide significant advantages in scheduling jobs generated from tasks representing computational workflows. Referring now to FIG. 4A, and in brief overview, a flow diagram depicts one embodiment of a method 400 of processing a computational workflow. The method 400 can begin by identifying, from a description of a computational workflow, a plurality of jobs ready for execution (act 402). The method 400 includes sorting, based on computational resource requirements associated with each job, the identified jobs into a prioritized queue (act 404). The method 400 includes provisioning one or more computational instances based on the computational resource requirements of the first prioritized job (act 406). The method 400 includes submitting the prioritized jobs for execution to the provisioned computational instance (act 408).

Figure 4B:
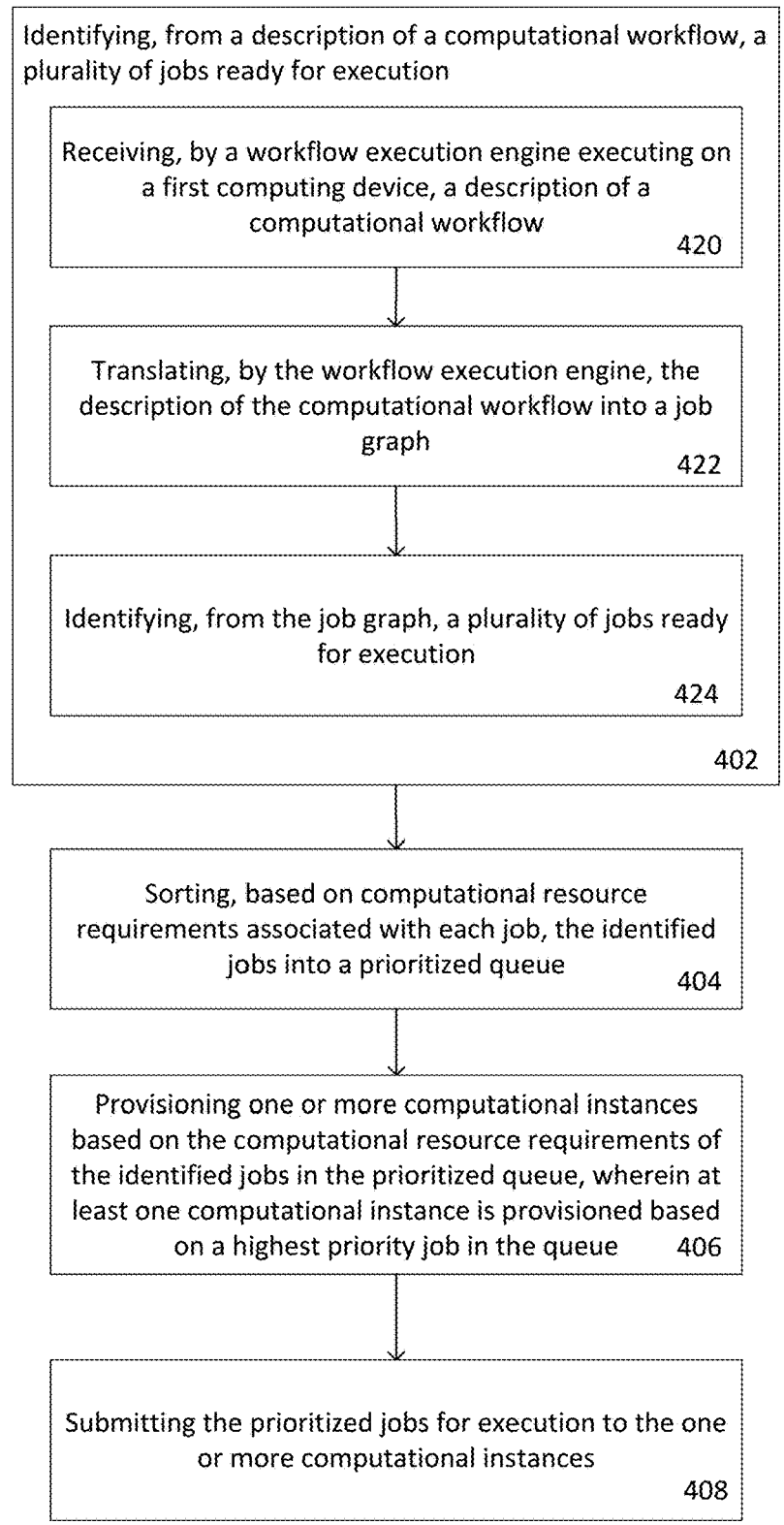
FIG. 4B is a flow diagram depicting one embodiment of a method of processing a computational workflow.

Referring now to FIG. 4B, a flow diagram depicts one embodiment of a method 400 of processing a computational workflow. The method 400 can begin by identifying, from a description of a computational workflow, a plurality of jobs ready for execution (act 402). Identifying a plurality of jobs ready for execution may further include receiving, by a workflow execution engine executing on a computing device, a description of a computational workflow (act 420). Identifying a plurality of jobs ready for execution may further include translating, by the workflow execution engine, the description of the computational workflow into a job graph (act 422). Identifying a plurality of jobs ready for execution may further include identifying, from the job graph, a plurality of jobs that are ready for execution (act 424). The method 400 includes sorting, based on the computational resource requirements associated with each identified job, the identified jobs into a prioritized queue (act 404). The method 400 includes provisioning one or more computational instances based on the computational resource requirements of the identified jobs in the prioritized queue, wherein at least one computational instance is provisioned based on a highest priority job in the queue (act 406). The method 400 includes submitting the prioritized jobs for execution to the one or more provisioned computational instances (act 408).

Referring now to FIGS. 4A and 4B in greater detail, and in connection with FIG. 2, the method includes identifying, from a description of a computational workflow, a plurality of jobs ready for execution (act 402). As previously described, jobs ready for execution are those jobs whose inputs (e.g., required data files and parameters) are currently available such that the job is runnable. In some embodiments, such as the embodiment shown in FIG. 4B, identifying a plurality of jobs ready for execution further includes receiving, by a workflow execution engine, a description of a computational workflow (act 420). As discussed above, and as will be understood by one of ordinary skill in the art, the workflow description may be a CWL file, WDL file, XML file, or other files containing a description of a computational workflow. The description of the computational workflow can be a bioinformatics or genomics workflow. The workflow execution engine may receive the workflow description from a client 102a in communication with the machine 106a over a network 104b. The workflow execution engine may receive the workflow description from an end user of the machine 106a.

In some embodiments, identifying a plurality of jobs ready for execution can further include translating, by the workflow execution engine, the description of the computational workflow into a job graph (act 422). As discussed above, computational workflows typically comprise a series of applications, or steps, in which input from one step depends on the output of another. In this way, computational workflows can be modelled as a DAG. In some embodiments, as jobs are scheduled, executed, and successfully completed, nodes in the job graph may be updated accordingly with the locations of completed output files. The job graph may thus be used to guide workflow execution by noting which applications (i.e., nodes) are currently executing, which applications have completed, and which applications are pending.

In some embodiments, identifying a plurality of jobs ready for execution can further include identifying, from the job graph, a plurality of jobs ready for execution (act 424). Executable jobs comprise those jobs in the job graph having needed inputs that are currently available, or "ready". At the beginning of workflow execution, the executable jobs are typically those that rely on inputs provided with the workflow. Downstream jobs can become ready or "runnable" as soon as their inputs become available, e.g., as preceding jobs complete execution. For example, these can be jobs that depend from outputs of other jobs which have completed. Due to the complex and distributed nature of typical workflow graphs (e.g., the job graph 350 of FIG. 3B), there may be multiple jobs that are ready for execution at any given stage in the execution of the received computational workflow. In some embodiments, the plurality of jobs ready for execution is maintained as a list or queue within the memory of the remote machine 106a, wherein the list may be re-populated and/or re-sorted whenever a job completes.

The method 400 includes sorting, based on computational resource requirements associated with each job, the identified jobs into a prioritized queue (act 404). In some embodiments, the identified jobs are sorted based on the cost of their execution, and prioritized such that those jobs that require more powerful instance types come first. Computational resource requirements can include a variety of factors, including: CPU speed, and quantity; random access memory (RAM); disk space; expected duration of execution; and various combinations thereof. In one embodiment, jobs are sorted first by the number and type of CPUs needed, and then by required RAM. Resource requirements may be obtained in a variety of ways. For example, resource requirements may be set by an end user for each job and stored or associated with the workflow, e.g. as metadata elements. Resource requirements may similarly be set by the author of the application associated with the job. In some embodiments, resource requirements may be predicted based on past data, such as previous executions of similar jobs, for example.

The method 400 includes provisioning one or more computational instances based on the computational resource requirements of the identified jobs in the prioritized queue, wherein at least one computational instance is provisioned based on a highest priority job in the queue (act 406). Once jobs are sorted, they are typically represented in a list or queue within the memory of the remote machine 106a. The highest priority job (e.g., the most expensive job in terms of computational resource requirements, such as number or type of CPUs and memory required) is selected. For example, the job with the largest resource requirements may require 6 CPUs and 10 gigabytes of RAM in order to successfully complete execution. This job may then be used to select and provision a computational instance sufficient to accommodate execution of that job. As discussed above, various providers exist that supply time-shared computing, networking, storage, and associated technology resources. These resources are commonly known as "cloud compute" and are available from several providers including Amazon Web Services (AWS), Google Cloud Engine (GCE), Microsoft Azure, Rackspace Cloud, and the like. Resources from these providers can be made available as on-demand resources and at fixed or dynamic prices. Such on-demand resources may be heterogeneous, allowing for the selection of resources optimized for both price and efficiency. For example, an AWS computational instance sufficient to support a job requiring 6 CPUs and 10 gigabytes of RAM could be a C4 High-CPU Double Extra Large (c4.2xlarge) instance.

The method 400 includes submitting the prioritized jobs for execution to the one or more provisioned computational instances (act 408). For example, once an instance is provisioned, the first prioritized job may be submitted to the instance for execution, and the job may then be removed from the queue of prioritized jobs. Once the first job has been submitted to the provisioned instance, the workflow execution engine may continue to attempt to submit the remaining jobs for execution. Notably, as the computational instance was selected and provisioned to accommodate a job with the largest amount of resource requirements, subsequent jobs in the prioritized queue are more likely to "pack" well onto that instance, increasing the efficiency of workflow execution, resource usage, and cost.

In some embodiments, submitting the prioritized jobs for execution to the one or more computational instances (act 408) can comprise using a bin packing algorithm, such as a first-fit-decreasing (FFD) strategy. A FFD strategy can refer to selecting the highest priority (e.g., highest resource requirement) job and attempting to match, or fit, that job to an instance that can accommodate the job. Attempting to match the selected job to an instance can include determining whether the selected job will successfully execute on that instance, e.g. by comparing the computational resource requirements of the job with the amount of available or un-used computational resources on that instance, which may be executing other jobs. If it is determined that the selected job will successfully execute, it may be submitted to that instance and then removed from the prioritized queue. However, if that job will not successfully execute, then the next, lower resource requirement, job in the prioritized queue may be selected instead. This process can repeat until each of the jobs in the queue has been considered or new jobs are added to the queue.

In some embodiments, determining whether a selected job will successfully execute on an instance can comprise determining whether the instance has sufficient free resources to accommodate that job. For example, an instance may have a heavy CPU load, but a large amount of free memory. In this case, a job with a high memory requirement but low CPU requirement may successfully execute on that instance. Similarly, an instance may have a heavy CPU load and low memory, but a large amount of available disk space. In this case, a job with low CPU and memory requirements, but a high disk space requirement, may successfully execute on that instance. Accordingly, systems and methods of the disclosure may schedule and submit jobs to instances by considering a variety of factors, leading to efficient scheduling and optimization of resource usage.

In some embodiments, in the event that a job will not successfully execute on a provisioned instance, the scheduling service may attempt to match the job to another instance that may have been previously provisioned (e.g., an instance in a current provisioned pool of instances managed by the scheduling service). In some embodiments, the pool of instances may be sorted, based on the available (i.e., free, or un-used) computational resources on each instance, into a prioritized queue. Like jobs, instances may be managed and sorted using a queue or list data structure, for example. In some embodiments, instances with the least amount of resources have the highest priority. Accordingly, in these embodiments, the highest resource requirement jobs are first matched to instances having the least or smallest amount of free resources, leading to efficient packing and combinations of executing jobs on those provisioned instances. In some embodiments, the prioritized queue of instances may be re-populated and/or re-sorted as the available computational resources on one or more instances increases or decreases (e.g., as a new instance is provisioned, or as a job completes and is removed from an instance).

In some embodiments, in the event that a job will not successfully execute on a provisioned instance, the scheduling service may provision a new instance based on the computational resource requirements of that job. In some embodiments, the scheduling service may first attempt to schedule all jobs on available instances, and then provision one or more additional computational instances based on the computational resource requirements of the highest priority unscheduled job. In some embodiments, the additional instances may have different computational resources than the previously provisioned instances. Once an additional instance has been provisioned, it is added to the pool of available instances and the scheduling service may attempt to match jobs to that instance accordingly.

In some embodiments, a maximum number of parallel running instances may be set prior to workflow execution. The maximum number of parallel running instances may be set by a user, for example, as a parameter associated with a submitted workflow. In the event that a maximum number of parallel running instances is reached for a running workflow, the scheduler may not provision a new instance for a selected job. If a selected job cannot be assigned to a running instance (e.g., if the resource requirements for the selected job exceed the available resource requirements on each of the running instances), and the maximum number of parallel running instances for the workflow has been reached, the job may be skipped in the queue, and the next job in the prioritized queue will be selected for scheduling. Any skipped or remaining jobs in the queue may then be assigned to an instance when either the required resources for a job become available on a running instance, or the number of running instances decreases as a result of job completion, and a new instance can be provisioned to accommodate the remaining jobs.

As discussed above, the completion of jobs may lead to the identification of new jobs that have become runnable. These jobs may also be added to the prioritized queue, which may be re-sorted according to computational resource requirements. In this way, a scheduling service according to the disclosure may continue to schedule new jobs as they become available on dynamically allocated instances in an efficient manner.

Additional Examples

Figure 5:
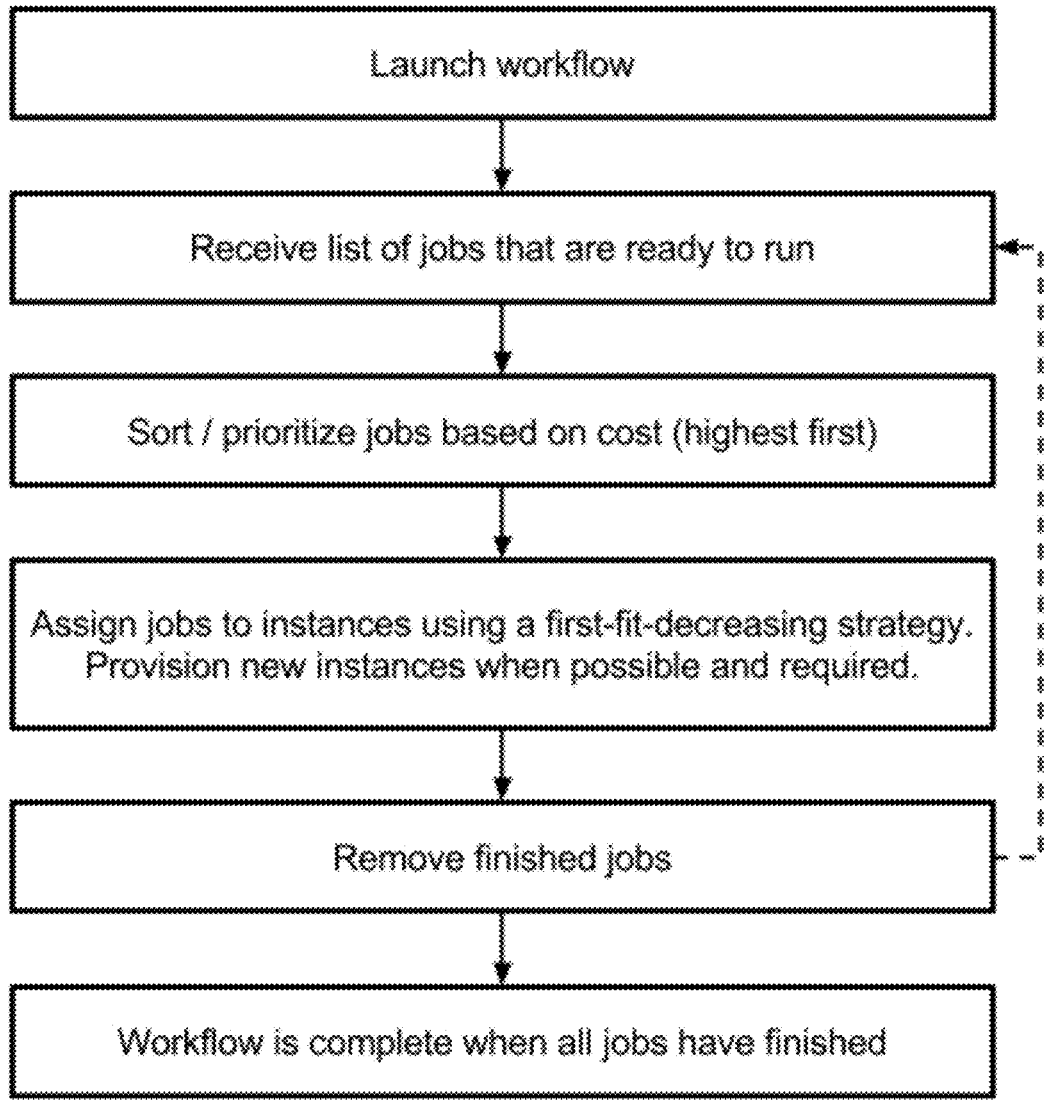
FIG. 5 is a flow diagram depicting one embodiment of a method of processing a computational workflow.

FIG. 5 depicts another embodiment of a method of processing a computational workflow. The method may be practiced in the context of a workflow execution system, such as the workflow execution system 200 of FIG. 2, for example. As shown in FIG. 5, a newly launched workflow is broken down into jobs as far as the scheduler can look ahead. These first jobs typically use the initial workflow inputs and produce intermediary files as outputs. Downstream jobs become runnable as soon as their inputs are available. Jobs are sorted based on the cost of their execution, and prioritized such that the jobs that require the most powerful instance types come first. The highest priority job (e.g., the most expensive job) is selected first and assigned to the instance that can accommodate the job with the least amount of free resources leftover. Finished jobs are removed from the list of pending jobs, and the list is repopulated based on input from a task manager, such as a job graph service or workflow execution engine according to the disclosure. The cycle can repeat until there are no more jobs left in the workflow.

Figure 6:
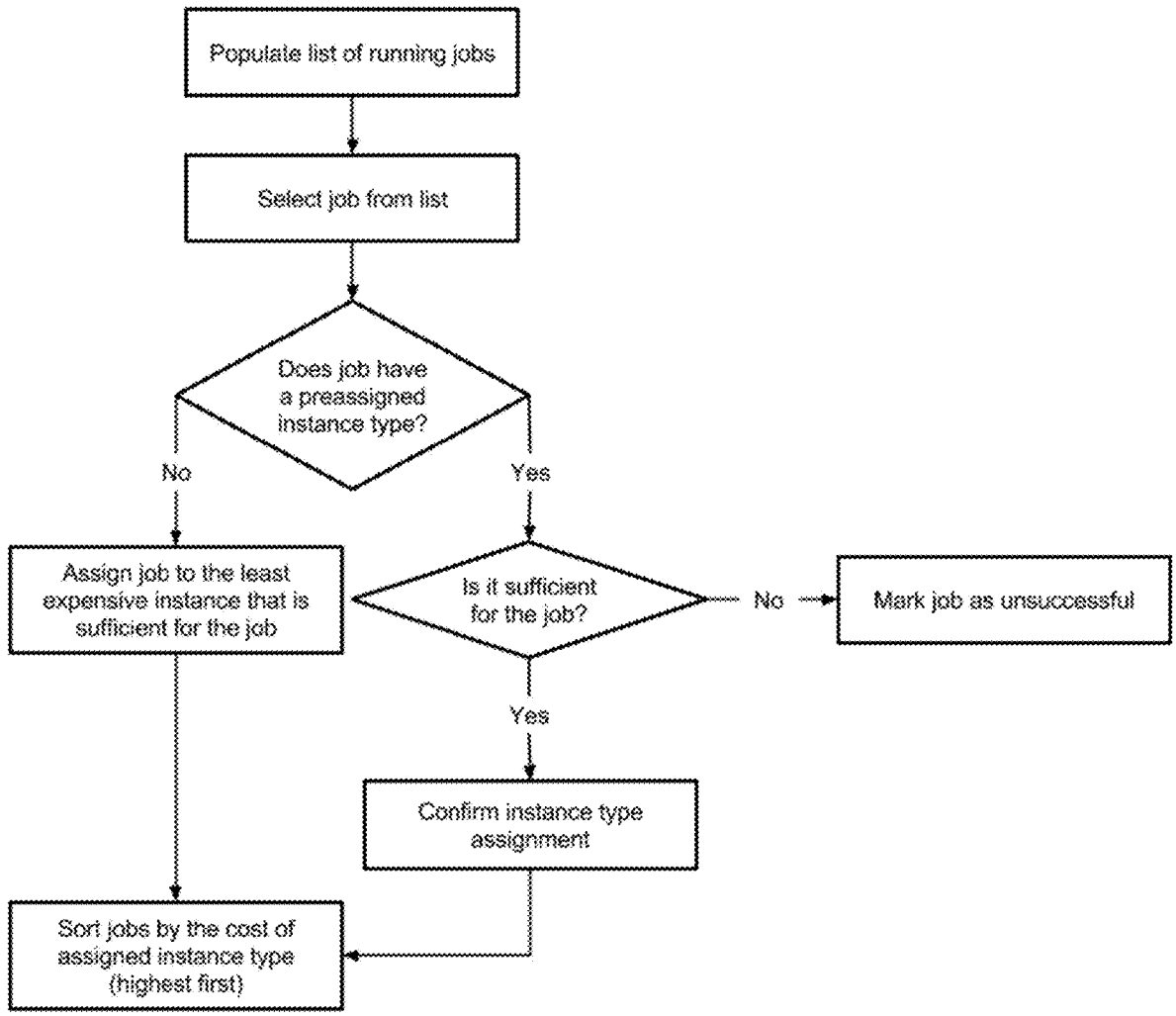
FIG. 6 is a flow diagram depicting one embodiment of a method of prioritizing jobs for scheduling.

FIG. 6 depicts an embodiment of a method of prioritizing jobs. As shown in FIG. 6, a list of running jobs is received from, e.g., a job graph service or a workflow execution engine. Each job in the list is selected and matched to an instance according to the resource requirements of the job. A job may have a preassigned instance type if the user set this field prior to workflow execution. In this case, a confirmation step may be implemented to ensure that the preassigned instance is sufficient for the job. If there is no preassigned instance type, the job may be assigned to the least expensive instance that can accommodate the resource requirements of the job. Once instances are matched, jobs may be sorted based on the cost of their assigned instance type (e.g., in descending order).

Figure 7:
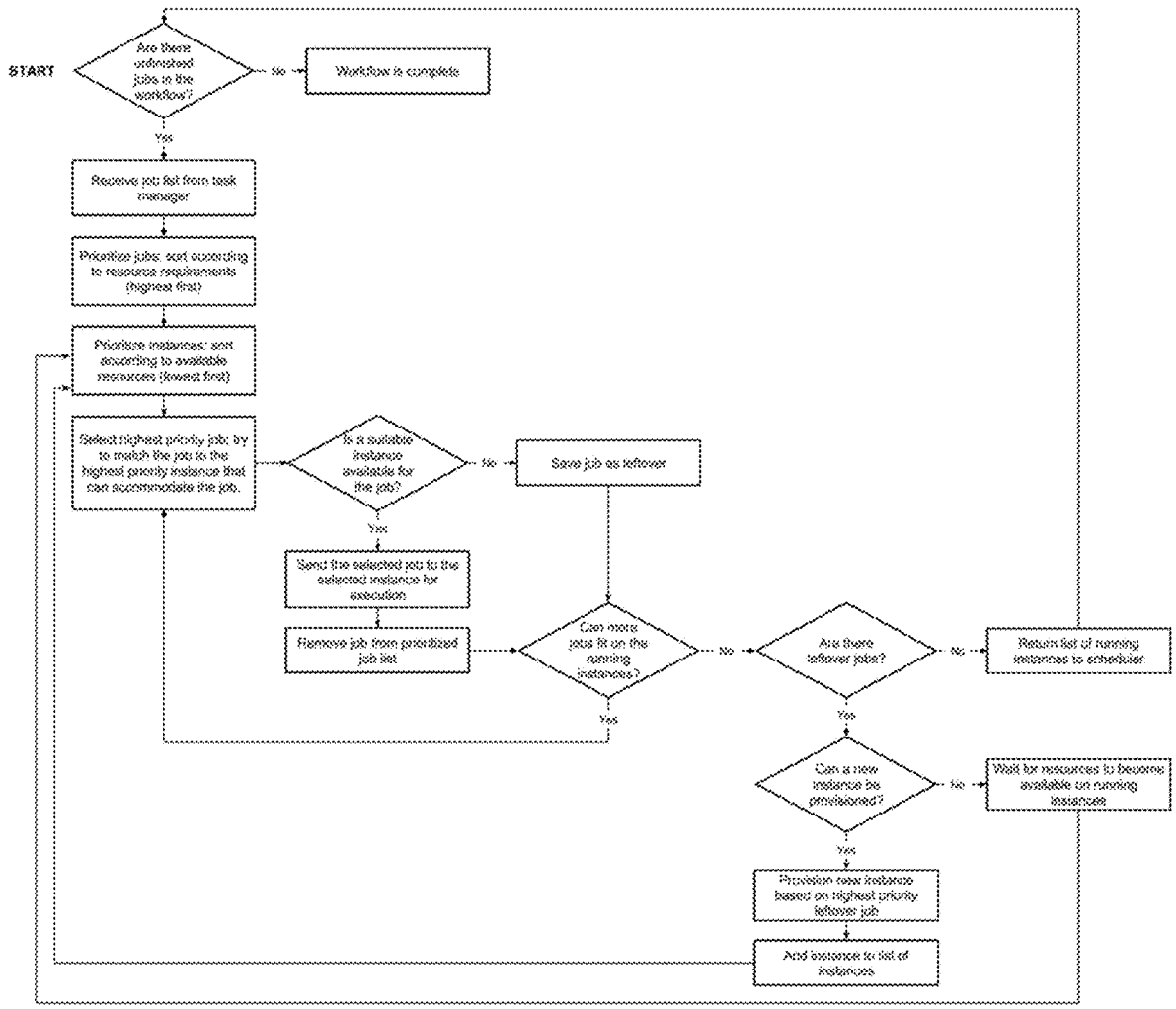
FIG. 7 is a flow diagram depicting one embodiment of a method of scheduling a plurality of jobs for execution.

FIG. 7 depicts an embodiment of a method of scheduling a plurality of jobs. A set of pending jobs is extracted from a workflow or task and received by a scheduler, such as a scheduling service or workflow execution engine according to the disclosure. The jobs are prioritized according to execution cost (highest first). Running instances (if available) are prioritized in order of available resources (lowest first). The highest priority job is selected and matched to the highest priority instance that can accommodate the job. If there is a suitable instance, the job is sent to that instance for execution. If there is no suitable running instance for that particular job, (or if there are no running instances at all, as in the case of a newly launched workflow), the selected job is saved as a leftover. If additional jobs in the list of pending jobs can fit on the currently available instances, the next highest priority job is selected and the cycle is repeated. If no more pending jobs can fit on the available instances, the scheduler checks for any leftover jobs (i.e., jobs for which a suitable instance was not available which was previously skipped in the prioritized queue). If there are leftover jobs, the scheduler will try to provision a new instance. If allowed, a new instance will be provisioned based on the resource requirements of the highest priority leftover job. The instance will be added to the list of running instances, which will be re-sorted prior to an additional cycle of job packing. If the scheduler is unable to provision a new instance, such as in the case of a maximum number of parallel running instances being reached, for example, the scheduler will wait for resources to become available on running instances. Resources become available on running instances as jobs successfully complete and are cleared from the running instances. In the first iteration of the scheduling cycle, there will be no running instances. In this case, the scheduler will not identify a suitable running instance for the highest priority job, and a new instance will be provisioned based on the resource requirements of that highest priority job. If there are additional jobs in the prioritized job queue, the scheduler will select the next job from the prioritized queue and attempt to fit the job onto the running instance (e.g. by comparing the computational resource requirements of the job with the amount of available computational resources on that instance).

Definitions

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples have been provided including with reference to FIGS. 1-7. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

All definitions, as defined and used herein, should be understood to control over dictionary definitions, and/or ordinary meanings of the defined terms.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method for scheduling jobs in a computational workflow environment, the method comprising:
   identifying, from a computational workflow by a workflow execution engine executing on a processor, a plurality of jobs ready for execution according to steps comprising (i) receiving a description of the computational workflow, (ii) translating the description of the computational workflow into a job graph comprising a plurality of nodes and edges representing executable applications and a flow of data elements between applications, and (iii) identifying, from the job graph, a plurality of jobs ready for execution;
   sorting, based on computational resource requirements associated with each identified job, the identified jobs into a first prioritized queue;
   provisioning a plurality of computational instances,
      sorting, based on computational resources associated with each computational instance, the computational instances into a second prioritized queue,
   submitting the prioritized jobs for execution on the prioritized computational instances based on (i) priorities associated with the identified jobs, (ii) priorities associated with the computational instances, and (iii) executability of an identified job on a candidate computational instance; and
   guiding workflow execution by updating (i) the job graph to reflect which jobs are currently executing, which jobs have completed, and which jobs are pending, and (ii) the second prioritized queue based on any increase or decrease in computational resources associated with the computational instances.

2. The method of claim 1, wherein the computational resource requirements comprise CPU and RAM.

3. The method of claim 1, further comprising sorting the one or more computational instances based on available resources.

4. The method of claim 1, wherein submitting the prioritized jobs for execution to the one or more computational instances comprises determining whether a prioritized job will execute on one of the provisioned computational instances.

5. The method of claim 4, further comprising provisioning an additional computational instance based on the computational resource requirement of the prioritized job if the prioritized job will not execute on the one or more provisioned computational instances.

6. The method of claim 5, wherein the additional computational instance has a different quantity of computational resources than the one or more computational instances.

7. The method of claim 1, wherein prioritized jobs are submitted to the one or more provisioned computational instances according to a first-fit-decreasing (FFD) strategy.

8. The method of claim 1, further comprising adding new jobs to the prioritized queue as they become available for execution.

9. The method of claim 1, wherein nodes represent executable applications and edges represent a flow of data elements between nodes.

10. The method of claim 1, wherein at least one computational instance is provisioned based on a highest priority job in the first prioritized queue and a highest priority computational instance in the second prioritized queue.

11. The method of claim 1, wherein the second prioritized queue is re-populated and/or re-sorted based on any increase or decrease in computational resources associated with the computational instances.

12. A computer-implemented method comprising, by one or more computer systems configured with executable instructions, the steps of:
   receiving a request for a workflow to be executed, wherein at least one action in the workflow is broken down into one or more jobs;
   identifying a set of jobs ready for execution according to steps comprising (i) receiving a description of the computational workflow, (ii) translating the description of the computational workflow into a job graph comprising a plurality of nodes and edges representing executable applications and a flow of data elements between applications, and (iii) identifying, from the job graph, a plurality of jobs ready for execution;
   sorting the identified set of jobs according to priorities associated therewith;
   provisioning a plurality of computational instances each having a priority associated therewith; and
   guiding workflow execution by (i) scheduling the highest priority job to be executed on the highest priority computational instance, (ii) scheduling the remaining jobs of the identified set of jobs to computational instances according to a first-fit-decreasing (FFD) strategy, (iii) updating job graph to reflect which jobs are currently executing, which jobs have completed, and which jobs are pending, and (iv) updating priorities associated with the computational instances based on any increase or decrease in computational resources associated therewith.

13. The computer-implemented method of claim 12, further comprising:
determining that resources required for a selected job exceed available resources on any available instance; and
provisioning an additional computational instance with sufficient computational resources for the selected job.

14. The computer-implemented method of claim 13, wherein the sorted instances is maintained as a list, the list being re-populated after each provisioning of an instance.

15. The computer-implemented method of claim 12, further comprising:
selecting a subsequent unscheduled job according to highest priority;
sorting the provisioned instances according to their available resources;
determining whether resources required for the selected job are available on one of the provisioned instances; and
scheduling the selected job on an instance according to a first-fit-decreasing strategy, wherein the highest priority job is matched to an instance with the smallest amount of free resources.

16. The computer-implemented method of claim 12, wherein unscheduled jobs are prioritized according to their resource requirements.

17. The computer-implemented method of claim 16, wherein a job's resource requirements are preset by a user.

18. The computer implemented method of claim 17, wherein a job's resource requirements are preset at a tool level.

19. The computer-implemented method of claim 12, wherein the provisioned instances are selected from a pool of available instances from a cloud computing provider, wherein a pool of available instances is heterogeneous with respect to computing power.

20. The computer-implemented method of claim 12, wherein the sorted jobs is maintained as a list, the list being re-populated after each job completes.

21. A method, in a data processing system comprising a processor and a memory coupled to the processor, for providing at least one virtual machine instance in a resource pool, comprising:
receiving a request for a workflow to be executed, wherein at least one action in the workflow is broken down into one or more jobs;
identifying a set of jobs ready for execution;
sorting the identified set of jobs according to priority;
provisioning a plurality of computational instances having priorities based at least in part on computational resources associated therewith; and
guiding workflow execution by (i) organizing the jobs into a job graph comprising a plurality of nodes and edges representing executable applications and a flow of data elements between applications, (ii) scheduling the highest priority job to be executed on the highest priority computational instance having sufficient computational resources to execute the highest priority job, (iii) scheduling the remaining jobs of the identified set of jobs to the provisioned computational instance according to a first-fit-decreasing strategy, (iv) updating nodes in the job graph to reflect which jobs are currently executing, which jobs have completed, and which jobs are pending, and (v) updating priorities of the computational instances based on any increase or decrease in computational resources associated therewith.

* * * * *